United States Patent [19]

Lott et al.

[11] Patent Number: 4,683,103
[45] Date of Patent: Jul. 28, 1987

[54] SPECTRAL SHIFT APPARATUS AND METHOD FOR A NUCLEAR REACTOR FUEL ASSEMBLY

[75] Inventors: Randy G. Lott, Swissvale; Frank J. Baloh, Dawson, both of Pa.

[73] Assignee: Westinghouse Electric Corp., Pittsburgh, Pa.

[21] Appl. No.: 701,051

[22] Filed: Feb. 12, 1985

[51] Int. Cl.$^4$ ............................................. G21C 7/26
[52] U.S. Cl. ................................. 376/209; 376/221; 376/328; 376/447
[58] Field of Search ............... 376/209, 221, 328, 331, 376/336, 337, 447, 434, 435

[56] References Cited

U.S. PATENT DOCUMENTS

| | | | |
|---|---|---|---|
| 2,987,455 | 6/1961 | Huston | 376/209 X |
| 3,031,393 | 4/1962 | Saur et al. | 376/209 X |
| 3,361,636 | 1/1968 | Bagge | 376/209 X |
| 3,574,060 | 4/1971 | DeParatesi et al. | 376/328 |
| 4,221,637 | 9/1980 | Malaval | 376/336 X |
| 4,371,495 | 2/1983 | Marlatt | 376/209 X |
| 4,432,934 | 2/1984 | Gjertsen et al. | 376/333 |
| 4,575,448 | 3/1986 | Marlatt | 376/209 |

FOREIGN PATENT DOCUMENTS

| | | |
|---|---|---|
| 648338 | 6/1984 | Belgium . |
| 1112346 | 6/1968 | United Kingdom . |
| 1233832 | 6/1971 | United Kingdom . |
| 1358984 | 7/1974 | United Kingdom . |
| 1511494 | 5/1978 | United Kingdom . |

OTHER PUBLICATIONS

*Technical Notes,* "A New Concept for Reactor Safety Devices", Gifford, W. C., HAN Report 50094 Del.

*Primary Examiner*—Paul A. Bell

[57] ABSTRACT

A fuel assembly in a nuclear reactor has a spectral shift apparatus including a plurality of displacer rods for controlling reactivity in the assembly and an apparatus for refurbishing the displacer rods for reuse. Each displacer rod contains a quantity of water equivalent to a small fraction of the rod volume. Also, the spectral shift apparatus includes a manifold with a central plenum and a rupturable disk connected to the manifold. The manifold is connected in flow communication with the displacer rods. The disk which seals the displacer rods as well as the manifold plenum is rupturable at a given pressure differential thereacross so as to allow entry of the moderator/coolant liquid into the manifold and rods. Also, a screen adjacent the disk restricts it to rupturing in one direction only. The spectral shift refurbishing apparatus includes a charging tool insertable within the manifold plenum and separate air and water conduits interconnecting the manifold and upper and lower portions of the respective displacer rods in flow communication so as to provide respective entrance paths for air under pressure from the charging tool to the upper rod portions and separate exit paths for liquid from the lower rod portions to the charging tool such that introduction of air under pressure along the entrance paths will force liquid from the rods along the exit paths until the level of the liquid within the rods lowers to the level of the conduits in their lower portions.

20 Claims, 10 Drawing Figures

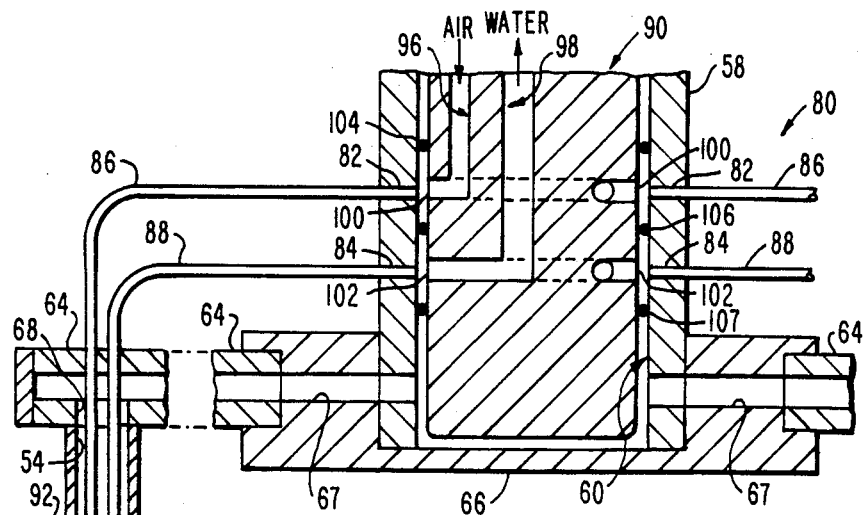
FIG. 8
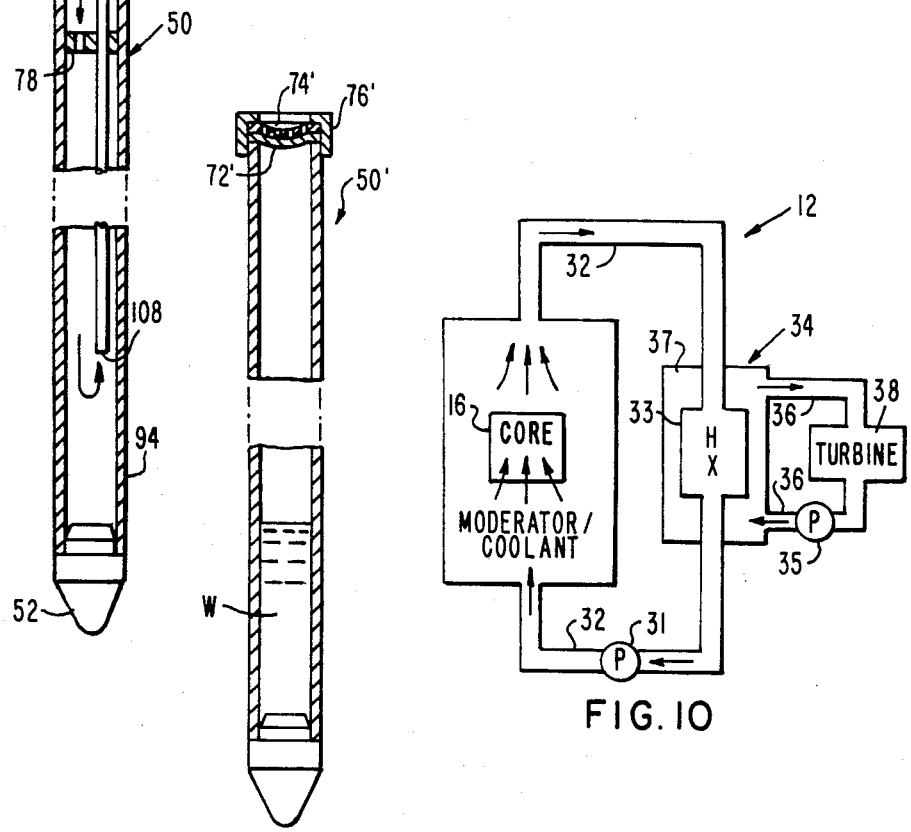
FIG. 9
FIG. 10

SPECTRAL SHIFT APPARATUS AND METHOD FOR A NUCLEAR REACTOR FUEL ASSEMBLY

CROSS REFERENCE TO RELATED APPLICATIONS

Reference is hereby made to the following copending applications dealing with related subject matter and assigned to the assignee of the present invention:

1. "Moderator Control Apparatus For A Nuclear Reactor Fuel Assembly" by D. B. Lancaster et al, assigned U.S. Ser. No. 623,744 and filed June 22, 1984 (W.E. 51,678).

2. "Nuclear Fuel Assembly With Improved Spectral Shift Rods" by H. M. Ferrari, assigned U.S. Ser. No. 638,333 and filed Aug. 6, 1984 (W.E. 52,061).

3. "Apparatus And Method For Refurbishing A Spectral Shift Mechanism For a Nuclear Reactor Fuel Assembly" by Frank J. Baloh et al, assigned U.S. Ser. No. 701,052 and filed Feb. 12, 1985 (W.E. 52,450).

BACKGROUND OF THE INVENTION

1. Field of the Invention

The present invention relates generally to nuclear reactors and, more particularly, is concerned with an apparatus and method employed in a nuclear fuel assembly for implementing a spectral shift therein which increases reactivity in the fuel assembly.

2. Description of the Prior Art

In the conventional designs of pressurized water reactors (PWR), an excessive amount of reactivity is designed into the reactor core at start-up so that as the reactivity is depleted over the life of the core there will still be sufficient reactivity to sustain core operation over a long period of time. However, since an excessive amount of reactivity is designed into the reactor core at the beginning of the core life, steps must be taken at that time to properly control it.

One technique to control reactivity is to produce an initial spectral shift which has the effect of increasing the epithermal (low reactivity) part of the neutron spectrum at the expense of the thermal (high reactivity) part. This results in production of fewer thermal neutrons and decreased fission. Then, as fission decreases during extended reactor operation, a reverse shift back to the thermal part of the neutron spectrum at the expense of the epithermal part is undertaken. Such control technique is primarily accomplished through the use of displacer rods. As the name implies, these rods are placed in the core to initially displace some of the moderator water therein said decrease the reactivity. Then, at some point during the core cycle as reactivity is consumed, the displacement associated with these rods is removed from the core so that the amount of moderation and therewith level of reactivity in the core are increased.

One approach considered for removing this displacement is through the use of movable mechanisms, similar to those associated with control rods. Such an approach is described in a U.S. patent application entitled "An Improved Water Displacer Rod Spider Assembly For A Nuclear Reactor Fuel Assembly" by Trevor A. Francis, filed Mar. 20, 1984 and assigned U.S. Ser. No. 595,154 (W.E. 51,560).

Another approach contemplated for removing the displacement is to have membranes provided on the ends of the displacer rods which are penetrated at some point in time to allow the rods to be filled with water. A small heating element surrounding a specially indented end cap on the hollow displacer rod is turned on at an appropriate time. The heat weakens the indented part of the end cap to the point where the external water pressure opens the end cap and fills the rod with water.

A further approach used to remove the displacement is the provision of at least one rod in the fuel assembly filled initially with helium or other suitable gas. Then, as reactor operation proceeds, the gas-filled rod expands and increases in length until it engages a spike mounted on the adjacent portion of the top nozzle. The spike pierces the upper end plug of the rod and permits the rod to fill with water. Such approach is described in U.S. Pat. No. 4,371,495 to Marlatt.

Still another approach to displacement removal is to withdraw water displacer rods at the desired time by using a drive mechanism. This approach is described in U.S. Pat. No. 4,432,934 to Gjertsen et al.

Yet another approach utilizes a rotatable valve disposed in the central opening of a manifold in flow communication with a plurality of water displacer rods. Burnable poison gas initially fills the rods and is slowly released therefrom by operating the valve to progressively open inlet ports to the rods in a sequential pattern. At the same time the poison gas is slowly released from the rods, the displacement is removed by filling the rods with coolant. This approach is described in the first patent application cross-referenced above.

While all of the above-cited prior approaches operate reasonably well and generally achieve their objectives under the range of operating conditions for which they were designed, a need still exists for an alternate approach to the implementation of the spectral shift concept in currently operating nuclear power plants in a cost-effective manner for achieving greater utilization of nuclear fuel being placed in such plants.

SUMMARY OF THE INVENTION

The present invention together with other components, some of which comprise the invention claimed in the third U.S. patent application cross-referenced above, provide a combination of refurbishable equipment and reactor operational transient adjustments for implementing the spectral shift concept in a manner designed to satisfy the aforementioned needs. While the present invention herein and the invention of the third cross-referenced application are particularly adapted for working together to implement the spectral shift concept on a reusable basis, it is readily apparent that each invention may be incorporated either singly or together in a nuclear reactor. However, both inventions are illustrated and described herein for facilitating a complete and thorough understanding of the present invention.

The combination of refurbishable equipment and reactor operations transient adjustments disclosed herein implements the spectral shift concept in a relatively simple way which is reusable and can be made highly reliable and immune to false actuation. I utilizes known technology and is not dependent on development of "high risk" features. Although substantial reactivity is inserted into the fuel assembly during the removal of moderator displacement, this is accomplished with the reactor in a shut-down condition. No special wiring nor plumbing, which would entail extensive modifications to the reactor internals and increase refueling time, is required to actuate the spectral shift.

Instead, a reactor system operational variable (i.e., temperature, pressure, flow, etc.) is used to actuate the removal of displacement. The actuation occurs on demand by the operator and not as a result of inaccurately predictable phenomena such as fissile material burnup, or material swelling or creep. The equipment can be fabricated economically and is easily refurbished for continued use. In summary, therefore, as compared to previous approaches to implementation of spectral shift, the equipment disclosed herein is less complicated, requires no extensive modifications to existing hardware and is not prone to inappropriate actuation.

Accordingly, the present invention is directed to an apparatus and method useful in a nuclear reactor fuel assembly to control the nuclear reactivity therein by implementation of a spectral shift wherein the fuel assembly includes an organized array of nuclear fuel rods which produce the reactivity and moderator/coolant liquid which flows along the fuel rods. The apparatus basically includes: (a) at least one elongated hollow tubular body having opposite ends and containing a quantity of water equivalent to a predetermined small fraction of the volume of the tubular body, with the body being adapted to displace a predetermined volume of the moderator/coolant liquid; (b) first means attached to and sealing one of the opposite ends of the tubular body; and (c) second means communicating with and sealing the other of the opposite ends of the tubular body, with the second means including a member being rupturable at a given pressure differential across the member.

More particularly, the spectral shift apparatus comprises: (a) a plurality of hollow displacer rods for displacing a predetermined volume of the moderator/coolant liquid associated with the fuel rods to decrease the nuclear reactivity from a given level; (b) a manifold disposable on the top of the fuel assembly and having a central inlet opening and a plurality of outlet openings; and (c) means connected to the manifold and disposed across its central inlet opening for sealing the same. The displacer rods have respective lower and upper opposite ends. Each of the displacer rods is sealed at its lower end, has a flow opening defined at its upper end and contains the aforementioned small predetermined quantity of water therein. The manifold is connected to the respective displacer rods with each of its outlet openings disposed in flow communication with the flow opening of one of the respective rods. The sealing means is rupturable at a given pressure differential thereacross for allowing entry of moderator/coolant liquid into the manifold and therefrom into the rods to increase the nuclear reactivity back to approximately the given level.

The spectral shift method for controlling nuclear reactivity in a reactor core containing a plurality of fuel assemblies comprises the operative steps of: (a) disposing a plurality of sealed displacer rods in the fuel assemblies in the flow path of primary moderator/coolant so as to displace a predetermined volume of the moderator/coolant and thereby decrease the reactivity from a given level, with the rods containing a quantity of water equivalent to a predetermined small fraction of the volume of the rods and being sealed so as to define a predetermined differential in pressure between the primary moderator/coolant and the water contained therein at which the sealed displacer rods will rupture; (b) elevating the power of the reactor core to its normal operating level and thereby the pressure of the water contained in the sealed displacer rods so as to establish a differential in pressure between the primary moderator/coolant and the water contained in the rods which is less than the predetermined pressure differential at which the rods will rupture; (c) maintaining the pressure of the primary moderator/coolant at the normal operating level; and (d) reducing the power of the reactor core to a small fraction of the normal operating level thereof and thereby the pressure of the water contained in the sealed rods relative to the pressure of the primary moderator/coolant until the predetermined differential in pressure therebetween is reached so as to cause rupture of the sealed rods and thereby flow of the primary moderator/coolant therein which increase the reactivity back to the given level.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 8 is an enlarged fragmentary elevational view, partially in sectional form, of the refurbishing apparatus being removed from the fuel assembly of FIG. 1.

FIG. 9 is an enlarged fragmentary elevational view, partially in sectional form, of an alternative form of the spectral shift apparatus.

FIG. 10 is a simplified representation of the overall nuclear reactor system illustrating particularly those parts to which operational transient adjustments are made which result in the actuation of the spectral shift apparatus of FIG. 2 and increase in nuclear activity in the reactor core.

DETAILED DESCRIPTION OF THE INVENTION

Figure 1:
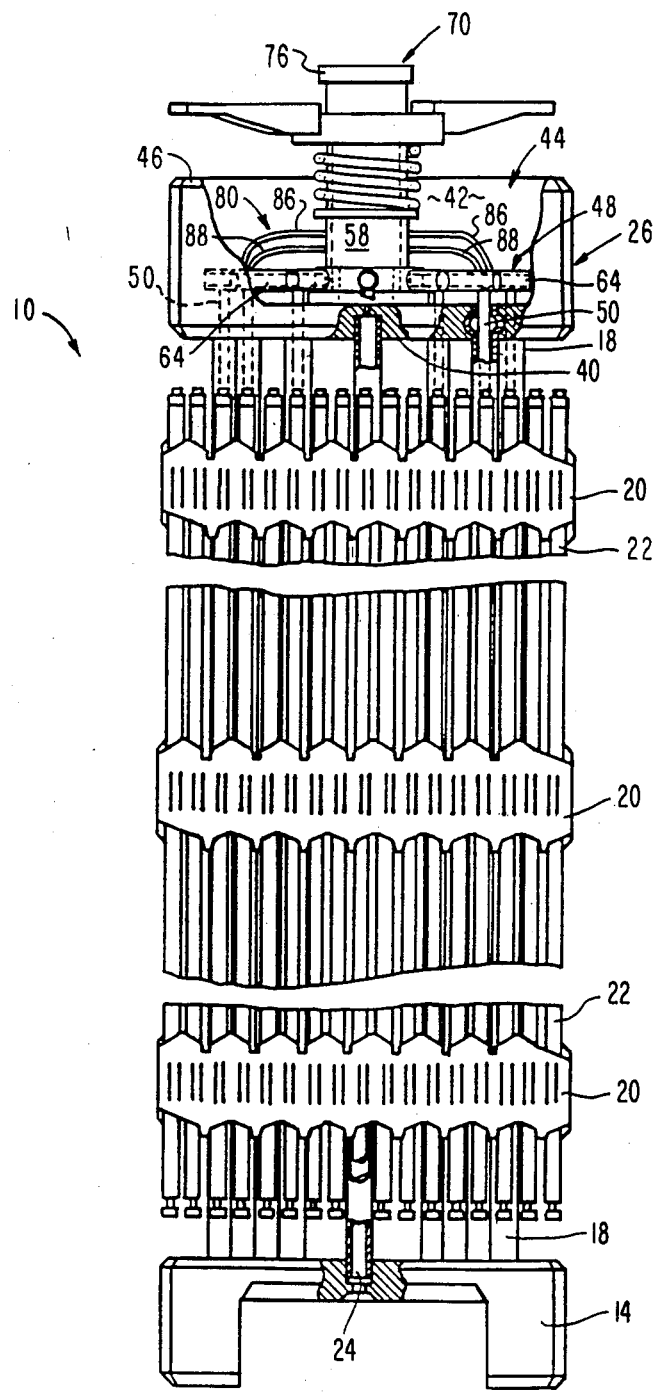
FIG. 1 is an elevational view of a conventional fuel assembly with the spectral shift apparatus of the present invention and the refurbishing apparatus of the invention claimed in the third patent application cross-referenced above disposed in operative relationship to the fuel assembly, the latter being shown in a vertically foreshortened form with a portion of its top nozzle broken away to more clearly show the components of the spectral shift and refurbishing apparatuses.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor (PWR), being illustrated diagrammatically in a simplified form in FIG. 10 and designated by the numeral 12. The fuel assembly 10 basically includes a lower end structure or bottom nozzle 14 for supporting the assembly 10 on the lower core plate (not shown) in the core 16 of the PWR 12, and a number of longitudinally extending guide tubes or thimbles 18 which project upwardly from the bottom nozzle 14. The assembly 10 further includes a plurality of transverse grids 20 axially spaced along the guide thimbles 18 and an organized array of elongated fuel rods 22 transversely spaced and supported by the grids 20. Also, the assembly 10 has an instrumentation tube 24 located in the center thereof and an upper end structure or top nozzle 26 attached to the upper ends of the guide thimbles 18. With such an arrangement of parts, the fuel assembly 10 forms an integral unit capable of being conventionally handled without damaging the assembly parts.

As mentioned above, the fuel rods 22 in the array thereof in the assembly 10 are held in spaced relationship with one another by the grids 20 spaced along the fuel assembly length. Each fuel rod 22 includes nuclear fuel pellets (not shown) and the opposite ends of the rod 22 are closed by upper and lower end plugs 28,30. The fuel pellets composed of fissile material are responsible for creating the reactive power of the PWR 12. A primary liquid moderator/coolant such as water, being held under high pressure such as 2250 psi so that it remains in liquid form, is pumped through the fuel assemblied 10 of the core 16 in order to extract heat generated therein. The primary coolant is circulated by a primary pump 31 around a closed primary path 32 which leads through a first chamber 33 of a heat exchanger 34 where the extracted heat is given up to a secondary flow of water circulated by a secondary pump 35 around a closed secondary path 36 which leads through a second chamber 37 of the heat exchanger 34. The secondary water turns to steam in the second heat exchanger chamber 37 and drives a turbine 38 which generates electricity for the production of useful work.

In the operation of the PWR 12 it is desirable to prolong the life of the reactor core 16 as long as feasible to better utilize the uranium fuel and thereby reduce fuel costs. To attain this objective, it is common practice to provide an excess of reactivity initially in the reactor core 16 and, at the same time, provide means to reduce excess reactivity at the early stage of the core operating cycle and then to increase reactivity later on. To partially control the fission process to attain this objective, a number of control rods (not shown) are reciprocally movable in a well-known manner in some of the guide thimbles 18 located at predetermined positions in the fuel assembly 10.

Also, as mentioned earlier, the displacement of moderator water to reduce excess reactivity at the early stage of the core operating cycle and then removal of the moderator displacement later to the increase reactivity has been a common technique used to assist in obtaining the above-cited objective. The apparatuses of the present invention and of the invention claimed in the third application cross-referenced above, which will be described in detail shortly hereafter, are directed toward implementing a spectral shift on a reusable basis to control reactivity. The apparatuses are associated with the top nozzle 26 and certain other of the guide thimbles 18 not having control rods installed in them.

More particularly, the top nozzle 26 includes a transversely extending adapter plate 40 having upstanding sidewalls 42 (the front wall being partially broken away in FIG. 1) secured to the peripheral edge thereof in defining an enclosure or housing 44. An annular flange 46 is secured to the top of the sidewalls 42. Suitably clamped to the annular flange 46 are leaf springs (not shown) which cooperate with the upper core plate (not shown) of the reactor core 16 in a conventional manner to prevent hydraulic lifting of the fuel assembly 10 caused by upward primary coolant flow, while allowing for changes in fuel assembly length due to core induced thermal expansion and the like.

Spectral Shift Apparatus and Method

Figure 2:
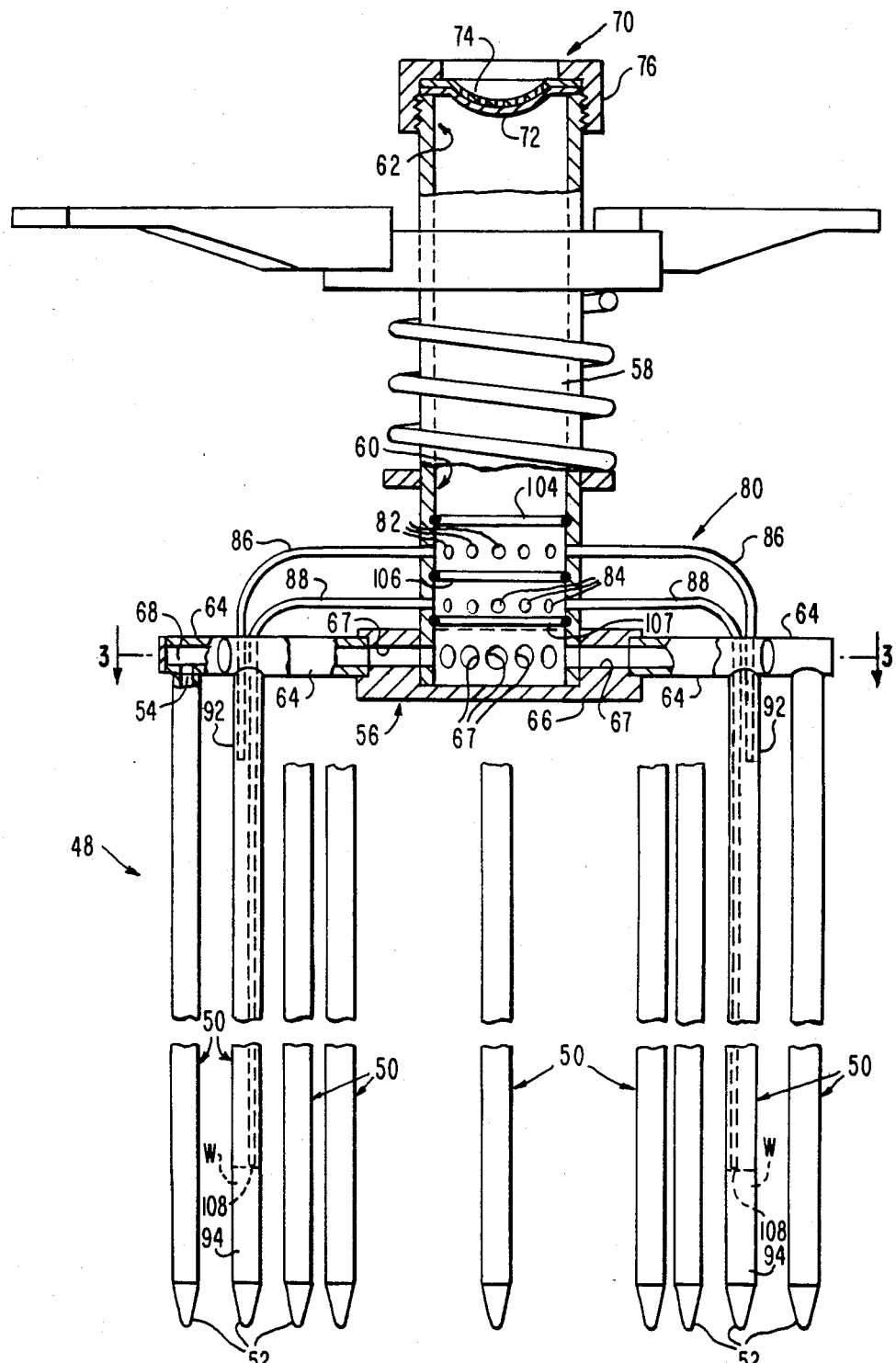
FIG. 2 is an enlarged, partially sectioned, elevational view of the spectral shift and refurbishing apparatuses being removed from the fuel assembly of FIG. 1.

As seen in FIG. 1, the spectral shift apparatus of the present invention, being generally designated 48, is disposed within the space defined by the housing 44 of the top nozzle 26 and extends into certain of the guide thimbles 18. Referring also to FIG. 2, the spectral shift apparatus 48 includes a plurality of water displacer rods 50 adapted to be inserted into respective ones of the guide thimbles 18 of the fuel assembly 10 for displacement of a predetermined volume of the moderator/coolant liquid associated with the fuel rods 22. The displacement volume of the moderator/coolant liquid decreases the reactivity (i.e., the hydrogen/ uranium ratio) of the reactor core 16 from a given normal level. Each of the displacer rods 50 is composed of an elongated hollow tubular body 51 being sealed at its lower end by an end plug 52 and having a flow opening 54 defined at its upper end. Also, a quantity of water W equivalent to a predetermined small fraction, for instance fifteen percent, of the volume of the rod 50 is contained within each rod.

Figure 3:
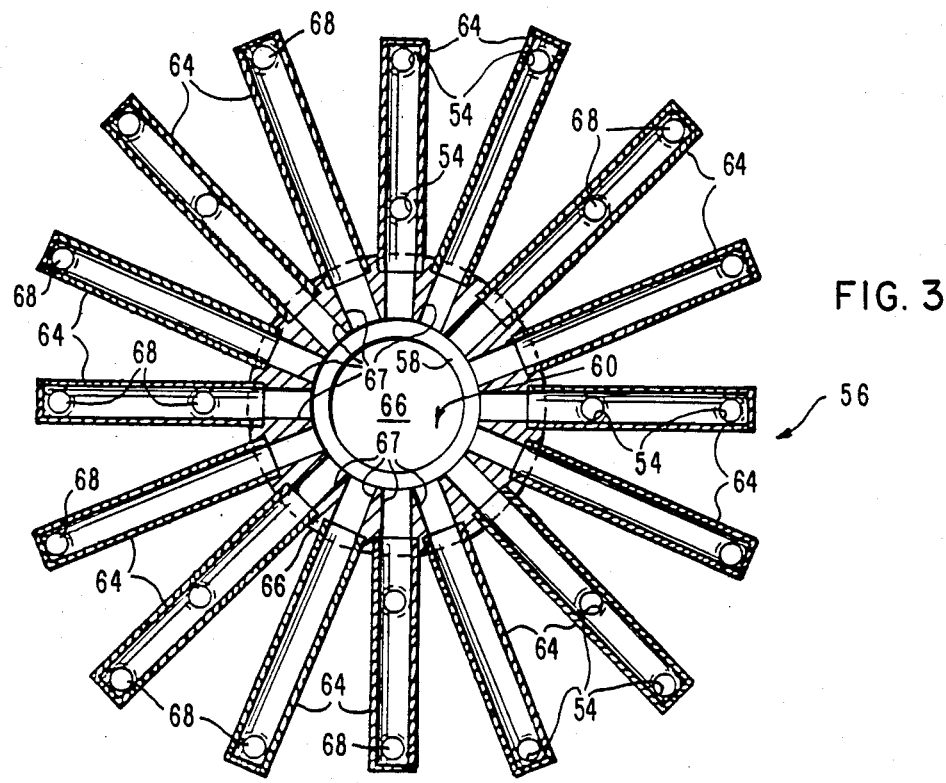
FIG. 3 is a sectional view of a portion of the spectral shift apparatus as taken along line 3—3 of FIG. 2.

The spectral shift apparatus 48 also includes a manifold, generally designated by the numeral 56, which interconnects the displacer rods 50. The manifold 56 is located on the top of the fuel assembly 10, being disposed within the top nozzle 26 and resting on its adapter plate 40 (see FIG. 1). Referring to FIGS. 2 and 3, the manifold 56 is in the form of a central cylindrical member 58 which defines a central plenum 60 and has a top central inlet opening 62 in flow communication with the plenum. The manifold 56 also has a plurality of hollow tubelike vanes 64 which are mounted on a hub 66 attached to the cylindrical member 58 so as to close the bottom thereof. The vanes 64 extend radially outwardly from the member 58 in flow communication with the central plenum 60 via radial flow channels 67 formed in the hub 66. The vanes 64 have outward ends, defining a plurality of outlet openings 68 of the manifold 56, which are connected to the respective upper ends of the displacer rods 50 so as to dispose the manifold outlet openings 68 in flow communication with the respective flow openings 54 of the displacer rods.

Figure 4:
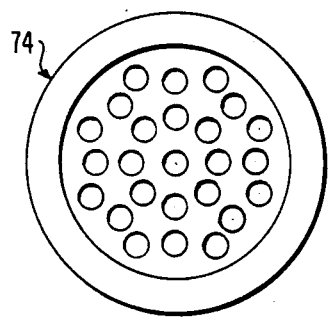
FIG. 4 is an enlarged top plan view of a baffle screen employed in the spectral shift apparatus of FIG. 2, the screen being shown removed from the apparatus.
Figure 5:
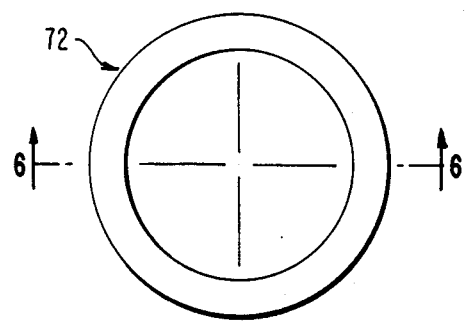
FIG. 5 is an enlarged top plan view of a rupturable disk employed in the spectral shift apparatus of FIG. 2, the disk being shown removed from the apparatus.
Figure 6:
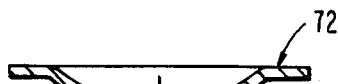
FIG. 6 is a sectional view of the disk as taken along line 6—6 of FIG. 5, illustrating the disk before it has ruptured.
Figure 7:
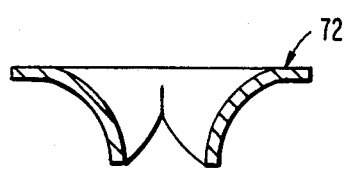
FIG. 7 is a sectional view of the disk similar to that of FIG. 6, but illustrating the disk after it has ruptured.

Further, in the preferred form, the spectral shift apparatus 48 includes means, generally designated 70, connected to the cylindrical member 58 of the manifold 56 and disposed across its center inlet opening 62 for sealing the same. In particular, the sealing means 70 includes a rupturable disk 72, a baffle screen 74, and an annular cap 76, commercially available per se as standard off-the-shelf items. The disk 72 is rupturable at a given pressure differential across it. For example, in order to avoid rupturing due to pressure variations caused by application of design duty cycle transients which at a maximum are not expected to be above 1600 psi, the disk 72 is designed to fail or rupture only if the pressure differential exceeds 1800 psi. The disk 72, as depicted in FIGS. 2, 5 and 6, is concave shaped and may be prescored to promote rupture in a particular direction, namely, inwardly into the central plenum 60 of the cyclindrical member 58. The ruptured state of the disk 72 is shown in FIG. 7. Additionally, to ensure that the disk 72 ruptures inwardly, the baffle screen 74 (see also FIG. 4) is disposed adjacent to it on its outer or upper side. The disk and screen 72,74 are removably and replaceably disposed on the upper end of the cylindrical member 58 in the sealing position seen in FIG. 2 by the annular cap 76 which is internally threaded to receive the external threads on the upper end of the member 58 for removably attaching the cap thereon. Thus, a ruptured disk 72 can at some subsequent time be readily removed and then replaced by a new disk simply by removing the cap 76.

Thus, in the preferred form of the spectral shift apparatus 48 as described above, a common sealed plenum approach is adopted wherein all of the displacer rods 50 share a common sealing disk 72. One disadvantage of this aproach is that if the single seal should fail prematurely, the entire apparatus, i.e., all of the displacer rods 50, would be flooded. An alternate approach is depicted in FIG. 9 wherein each of the displacer rods 50' is sealed separately. In the latter approach, each of the rods employs its own rupturable disk 72', baffle screen 74' and annular cap 76' which together function the same as before but now only with respect to the one displacer rod 50'. The advantage of this arrangement is that if one of many seals in the apparatus fails prematurely, its effect will be far less noticeable from a power peaking and reactivity insertion viewpoint. However, the common sealed plenum approach is appealing because of the reduced number of parts and simplicity from a refurbishment point of view. The ultimate choice between which of these two different approaches to use should be based on trade-offs of seal reliability, power peaking factors, and other licensing issues. Regardless of the approach chosen (i.e., single or multiple seals), the seal is designed to rupture on demand and to provide the desired flooding of the displacer rods 50.

The method of carrying out the spectral shift for controlling nuclear reactivity in the reactor core 16, utilizing the above-described apparatus 48, will now be discussed, particularly with reference to FIG. 10. Once an amount of water equivalent to approximately fifteen percent of the rod volume is put into each rod 50 of the apparatus 48 and it is sealed by attaching the rupturable disk 72, the desired number of spectral shift apparatuses 48 are placed on the respective fuel assemblies 10 with their displacer rods 50 inserted within the guide thimbles 18 of the fuel assemblies 10 in the reactor core 16. In such positions, the displacer rods 50 are disposed in the closed primary flow path 32 of the primary moderator/coolant being pumped by the primary pump 31 so as to displace a predetermined volume of the primary moderator/coolant dependent upon the size of the rods 50. In such manner, the spectrum of nuclear reactivity produced by the fuel rods 22 in the fuel assemblies 10 in the core 16 is shifted down or decreased from an excessively high, initial level.

Next, the power of the reactor core 16 is elevated to its normal operating level, ordinary by manipulation of control rods (not shown) which are moved relative to certain of the guide thimbles 18. Also, the operation of the primary pump 31 increases the pressure of the primary moderator/coolant in the flow path 32 to the normal operating level. At this level of reactor operation, the pressure of the water within the displacer rods 50 is also elevated. During normal operation the pressure differential across the rupturable disk 72, based on the pressure of the water contained in the sealed displacer rods 50 relative to the pressure of the primary moderator/coolant, will be 1150 psi or less. As mentioned earlier, the disk is designed to withstand pressure variations due to operating transients up to approximately 1800 psi.

When rupture of the disk 72, flooding of the rods 50 and, thus, implementation of the reverse spectral shift is desired, the following unique operational transient is imposed, while maintaining the pressure of the primary moderator/coolant at the normal operating level of approximately 2250 psi. The reactor power is decreased to about two percent of the normal operating level, with the turbine 38 being taken off-line and the reactor core 16 being made subcritical by an amount of reactivity equivalent to the maximum reactivity that could be added by rupture of the disk 72 and flooding of the rods 50. The primary coolant temperature is reduced to 375-400 degrees F. by dropping steam pressure. At 400 degrees F., the saturation pressure inside each of the rods 50 is approximately 250 psi and the differential pressure across the rupturable disk 72 is approximately 2000 psi, above the predetermined differential of 1800 psi at which the disk is designed to rupture. Thus, the disk 72 ruptures inward and the displacer rods 50 are flooded, completing the reverse spectral shift which returns the reactivity back to the desired higher level. Means in the form of a flow restricter 78 is disposed in the upper portion tubular body 51 of each displacer rod 50 for restricting the rate of moderator/coolant flow into the body 51 upon rupture of the disk 72. Finally, the reactor core 16 is returned to normal power.

To obtain maximum "spectral shift" benefit, as many fuel assemblies as possible should be equipped with the apparatus 48, for instance, all fuel assemblies without installed control rod assemblies. To minimize or eliminate extension to the refueling down-time, refurbishment of the apparatus 48, consisting of draining the rods 50 and replacing the ruptured disks 72, should probably be done most efficiently off-line. For instance, after installing a refurbished apparatus 48 into the reactor core 16, the removed apparatus can be taken to the fuel storage area and make ready for installation during the next refueling stop. Temporary storage of the apparatuses can be made in the stored fuel. An apparatus lifetime of 3-5 cycles appears to be feasible.

Refurbishing Apparatus and Method

Also in FIGS. 1 and 8, the refurbishing apparatus, constituting the invention of the third cross-referenced application and being designated 80, is shown associated in operative relationship with the spectral shift apparatus 48 for ensuring its continued use in the fuel assembly 10 or reuse in other fuel assemblies. The refurbishing apparatus 80 used to remove or drain the moderator/coolant from each of the displacer rods 50 basically includes a plurality of first and second ports 82,84 defined on the central cylindrical member 58, a pair of first and second conduits 86,88 extending between the cylindrical member 58 and each respective displacer rod 50 and a generally cylindrical charging tool 90 insertable within the central plenum 60 of the cylindrical member 58. While only two pairs of the first and second conduits 86,88 are seen in FIGS. 1, 2 and 8, it should be understood that there will be a pair of conduits associated with each of the displacer rods.

More particularly, the first and second ports 82,84 are vertically displaced from one another and both communicate with the central plenum 60. Each pair of first and second conduits 86,88 in the form of thin elongated capillary tubes interconnect in flow communication a respective pair of the first and second ports 82,84 with respective upper and lower portions 92,94 of a respective one of the displacer rods 50. As seen in FIG. 8, the first and second conduits 86,88 lead from the first and second ports 82,84, in the form of holes in the cylindrical member 58, radially outward along a respective vane 64 to locations aligned above the one displacer rod 50. Then, the conduits are bent ninety degrees to lead downward through the vane 64 and through the upper flow opening 54 of the rod 50. The first conduit 86 terminates contiguous with the upper portion 92 of the rod 50 a short distance below the vane 64, whereas the second conduit 88 leads down through the flow restricter 78, terminating contiguous with the lower portion 94 of the rod 50 a short distance above the lower end plug 52 of the rod 50.

The charging tool 90 has first and second flow passageways 96,98 defined therein with corresponding first and second flow openings 100,102. Means in the form of a plurality of O-rings 104,106,107 are provided to adapt the cylindrical member 58 and the charging tool 90 to seal with one another so as to place the first and second flow openings 100,102 in separate flow communication respectively with the first and second ports 92,94 of the cylindrical member 58. Preferably, the O-rings 104,106,107 are disposed on the interior wall of cylindrical member 58 within the central plenum 60 thereof. The one O-ring 104 is located above the first port 92, whereas the other O-ring 106 is located below the first port 92 and above the second port 94 and the third O-ring 107 is located below the second port 94.

It will be seen that when the ruptured disk 72 is removed from the cylindrical member 58 and the charging tool 90 is inserted therein, the first conduit 86 and first flow passageway 96 together provide an entrance path for air under pressure to the upper portion 92 of the displacer rod 50. On the other hand, the second conduit 88 and second flow passageway 98 together provide an exit path for moderator/coolant, such as water, in the rod 50 from the lower portion 94 thereof which is separate from the entrance path. Therefore, the water within the rod 50 can be removed by introducing air under pressure along the entrance path into the upper rod portion 92. Such air under pressure forces the water to flow along the exit path up the second conduit 88 from the lower rod portion 94 until the level of the liquid within the hollow rod 50 lowers to the level of the lower end 108 of the second conduit 88. The second conduit end 108 is located a distance from the bottom of the rod 50 which is proportioned relative to the length of the rod to leave a quantity of water W within the rod equivalent to approximately fifteen percent of the rod volume.

When the water level in the rod 50 has lowered to the point where air exits the second conduit 88 and the second passageway 98, this is a signal to the operator that all of the water intended to be drained from the rod 50 has been drained. Then, the charging tool 90 can be removed from the cylindrical member 58 and a new unruptured disk attached on its upper end to seal the evacuated displacer rods 50 and the common central plenum 60.

It should be readily apparent to those skilled in the art that within the purview of the present invention the hollow tubelike vanes 64 with their radial channels 67 could be substituted for the air conduits 86. The recharging tool 90 would then be similarly modified by locating the air passageway 96 in the lower end thereof for flow communication with the channels 67 of the vanes 64 and with one O-ring being disposed above another O-ring being disposed below the inlet end of channels 67 for separate flow communication of the air and the water whereby air under pressure enters through the channels 67 and the water exits through the conduits 88. Such mofified arrangement would eliminate the air conduits 86 and the need for a third O-ring.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. For use in a fuel assembly for a nuclear reactor including an organized array of nuclear fuel rods and moderator/coolant liquid flowing along said fuel rods, a spectral shift apparatus for controlling nuclear reactivity in said assembly, said apparatus comprising:
   (a) at least one elongated hollow tubular body having opposite ends and containing a quantity of water equivalent to a predetermined small fraction of the volume of said tubular body, said body being adapted to displace a predetermined volume of said moderator/coolant liquid;
   (b) first means attached to and sealing one of said opposite ends of said tubular body; and
   (c) second means communicating with and sealing the other of said opposite ends of said tubular body, said second means including
      (i) a member in the form of a replaceable disk being rupturable at a given pressure differential across said member,
      (ii) a baffle screen being disposed adjacent to said rupture disk so as to restrict said disk to rupturing in one predetermined direction, and
      (iii) an annular cap removably attached to said other opposite end of said tubular body for coupling said disk and screen thereto so as to seal said other end thereof.

2. The spectral shift apparatus as recited in claim 1, wherein said quantity of water contained in said tubular body is equivalent to approximately fifteen percent of the volume of said body.

3. The spectral shift apparatus as recited in claim 1, further comprising:

(e) third means communicating with said tubular body for restricting the rate of moderator/coolant liquid flow into said body upon the rupture of said member.

4. For use in a fuel assembly for a nuclear reactor including an organized array of nuclear fuel rods, a number of elongated guide thimbles strategically located within said fuel rod array, and a moderator/coolant liquid flowing upwardly along said fuel rods, a spectral shift apparatus for controlling nuclear reactivity in said assembly, said apparatus comprising:
  (a) a plurality of hollow displacer rods insertable into respective ones of said guide thimbles for displacing a predetermined volume of said moderator/coolant liquid associated with said fuel rods to decrease the nuclear reactivity from a given level, said displacer rods having respective lower and upper opposite ends, each of said displacer rods being sealed at its lower end, having a flow opening defined at its upper end and containing a quantity of water equivalent to a predetermined small fraction of the volume of said rod;
  (b) a manifold disposable on the top of said fuel assembly and having a central inlet opening and a plurality of outlet openings, said manifold being connected to said respective displacer rods with each of its outlet openings disposed in flow communication with said flow opening of one of said respective rods; and
  (c) means connected to said manifold and disposed across its central inlet opening for sealing the same, said means being rupturable at a given pressure differential thereacross for allowing entry of said moderator/coolant liquid into said manifold and said rods to increase said nuclear reactivity to approximately said given level.

5. The spectral shift apparatus as recited in claim 4, wherein said quantity of water contained in each said displacer rod is equivalent to approximately fifteen percent of the volume of said rod.

6. The spectral shift apparatus as recited in claim 4, wherein said manifold includes:
  a central cylindrical member which defines a central plenum with said central inlet opening of said cylindrical member in flow communication with said plenum; and
  a plurality of hollow tube-like vanes mounted on and extending radially outwardly from said cylindrical member and connected in flow communication with said central plenum, said vanes having outward ends connected to said respective displacer rods at upper ends thereof and defining said outlet openings of said manifold being connected in flow communication with said respective flow openings of said displacer rods.

7. The spectral shift apparatus as recited in claim 4, wherein said rupturable means is a rupture disk.

8. The spectral shift apparatus as recited in claim 7, further comprising means being disposed adjacent to said rupture disk so as to restrict said disk to rupturing in one predetermined direction.

9. The spectral shift apparatus as recited in claim 8, wherein said means is a baffle screen.

10. The spectral shift apparatus as recited in claim 9, further comprising an annular cap attached to said manifold for coupling said disk and screen thereto so as to seal said inlet opening therein.

11. The spectral shift apparatus as recited in claim 4, further comprising:
  (e) means disposed within each of said displacer rods and communicating with said flow opening therein for restricting the rate of said moderator/coolant liquid flow into said rod upon the rupturing of said rupturable means.

12. A spectral shift method for controlling nuclear reactivity in a reactor core containing a plurality of fuel assemblies with organized arrays of nuclear fuel rods which produce the reactivity and primary moderator/coolant which flows along the fuel rods, said spectral shift method comprising the steps of:
  (a) disposing a plurality of sealed displacer rods in said fuel assemblies in a flow path of said primary moderator/coolant so as to displace a predetermined volume of said moderator/coolant and thereby decrease the nuclear reactivity from a given level, said rods containing a quantity of water therein equivalent to a predetermined small fraction of the volume of said rods and being sealed so as to define a predetermined differential in pressure between said primary moderator/coolant and said water contained therein at which said sealed displacer rods will rupture;
  (b) elevating the power of said reactor core to its normal operating level and thereby the pressure of said water contained in said sealed displacer rods so as to establish a differential in pressure between said primary moderator/coolant and said water contained in said sealed displacer rods which is less than said predetermined pressure differential at which said displacer rods will rupture;
  (c) maintaining the pressure of said primary moderator/coolant at the normal operating level; and
  (d) reducing the power of said reactor core to a small fraction of the normal operating level thereof and thereby the pressure of said water contained in said sealed displacer rods relative to said pressure of said primary moderator/coolant until said predetermined differential in pressure therebetween is reached so as to cause rupture of said sealed displacer rods and thereby flow of said primary moderator/coolant therein which increases the nuclear reactivity back to said given level.

13. The spectral shift method as recited in claim 12, wherein said small fraction of said normal operating level to which said reactor power is reduced is approximately two percent.

14. The spectral shift method as recited in claim 12, wherein said predetermined differential in pressure at which rupture will occur is approximately 1800 psi.

15. The spectral shift method as recited in claim 12, wherein said quantity of water contained in each said displacer rod is equivalent to approximately fifteen percent of the volume of said rod.

16. The spectral shift method as recited in claim 12, wherein said reducing of said power of said reactor core is achieved by making said reactor core subcritical by an amount of reactivity equivalent to the maximum reactivity that could be achieved by rupture of said sealed displacer rods.

17. For use in a fuel assembly for a nuclear reactor including an organized array of nuclear fuel rods and moderator/coolant liquid flowing along said fuel rods, a spectral shift apparatus for controlling nuclear reactivity in said assembly, said apparatus comprising:

(a) at least one elongated hollow tubular body having opposite ends and containing a quantity of water equivalent to a predetermined small fraction of the volume of said tubular body, said body being adapted to displace a predetermined volume of said moderator/coolant liquid;

(b) first means attached to and sealing one of said opposite ends of said tubular body; and (c) second means communicating with and sealing the other of said opposite ends of said tubular body, said second means including (i) a member in the form of a replaceable disk being rupturable at a given pressure differential across said member, and (ii) a manifold disposable on the top of said fuel assembly and having at least one opening interconnected to and in flow communication with said other opposite end of said tubular body, said rupturable member being disposed across said one opening.

18. The spectral shift apparatus as recited in claim 17, wherein said replaceable rupture disk is prescored.

19. The spectral shift apparatus as recited in claim 17, wherein said second means further includes a baffle screen being disposed across said one opening adjacent to said rupture disk so as to restrict said disk to rupturing in one predetermined direction.

20. The spectral shift apparatus as recited in claim 19, wherein said second means further includes an annular cap removably attachable to said other opposite end of said tubular body for coupling said disk and screen thereto so as to seal said other end thereof.

* * * * *